US009608833B2

United States Patent
Yu et al.

(10) Patent No.: US 9,608,833 B2
(45) Date of Patent: *Mar. 28, 2017

(54) SUPPORTING MULTIPLE MULTICAST TREES IN TRILL NETWORKS

(75) Inventors: Shunjia Yu, San Jose, CA (US); Nagarajan Venkatesan, Santa Clara, CA (US); Anoop Ghanwani, Rocklin, CA (US); Phanidhar Koganti, Sunnyvale, CA (US); Mythilikanth Raman, San Jose, CA (US); Rajiv Krishnamurthy, San Jose, CA (US); Dilip Chatwani, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/030,688

(22) Filed: Feb. 18, 2011

(65) Prior Publication Data

US 2011/0299527 A1 Dec. 8, 2011

Related U.S. Application Data

(60) Provisional application No. 61/352,726, filed on Jun. 8, 2010, provisional application No. 61/427,057, filed on Dec. 23, 2010.

(51) Int. Cl.
| | | |
|---|---|---|
| *H04L 12/28* | (2006.01) | |
| *H04L 12/18* | (2006.01) | |
| *H04L 12/801* | (2013.01) | |

(52) U.S. Cl.
CPC .......... *H04L 12/1886* (2013.01); *H04L 47/15* (2013.01)

(58) Field of Classification Search
CPC ....................................................... H04L 12/56
(Continued)

(56) References Cited

U.S. PATENT DOCUMENTS

| 829,529 A | 8/1906 | Keathley |
|---|---|---|
| 5,390,173 A | 2/1995 | Spinney |

(Continued)

FOREIGN PATENT DOCUMENTS

| CN | 102801599 A | 11/2012 |
|---|---|---|
| EP | 0579567 | 5/1993 |

(Continued)

OTHER PUBLICATIONS

"Switched Virtual Internetworking moves beyond bridges and routers", (Sep. 23, 1994), No. 12, New York, US.

(Continued)

*Primary Examiner* — Robert M Morlan
*Assistant Examiner* — Nourali Mansoury
(74) *Attorney, Agent, or Firm* — Shun Yao; Park, Vaughan, Fleming & Dowler LLP

(57) ABSTRACT

Systems and techniques for supporting multiple multicast trees are described. Some embodiments provide a system that determines an internal multicast group identifier based on a source address, a multicast address, and a multicast tree identifier field associated with a multicast packet. The system can then forward the multicast packet based on the internal multicast group identifier. Specifically, the system can determine a first set of bits based on the source address and the multicast address of the multicast packet. The system can determine a second set of bits based on the multicast tree identifier field of the multicast packet. Next, the system can combine the first set of bits and the second set of bits to obtain the internal multicast group identifier. In some embodiments, the scope of an internal virtual network identifier does not extend beyond a switch or a forwarding module within a switch.

21 Claims, 7 Drawing Sheets

(58) Field of Classification Search
USPC .................................. 370/252, 390, 392
See application file for complete search history.

(56) References Cited

U.S. PATENT DOCUMENTS

| | | | |
|---|---|---|---|
| 5,802,278 A | 9/1998 | Isfeld | |
| 5,878,232 A | 3/1999 | Marimuthu | |
| 5,879,173 A | 3/1999 | Poplawski | |
| 5,959,968 A | 9/1999 | Chin | |
| 5,973,278 A | 10/1999 | Wehrli, III | |
| 5,983,278 A | 11/1999 | Chong | |
| 5,995,262 A | 11/1999 | Hirota | |
| 6,041,042 A | 3/2000 | Bussiere | |
| 6,085,238 A | 7/2000 | Yuasa | |
| 6,092,062 A | 7/2000 | Lohman | |
| 6,104,696 A | 8/2000 | Kadambi | |
| 6,185,214 B1 | 2/2001 | Schwartz | |
| 6,185,241 B1 | 2/2001 | Sun | |
| 6,295,527 B1 | 9/2001 | McCormack | |
| 6,331,983 B1 | 12/2001 | Haggerty | |
| 6,438,106 B1 | 8/2002 | Pillar | |
| 6,498,781 B1 | 12/2002 | Bass | |
| 6,542,266 B1 | 4/2003 | Phillips | |
| 6,553,029 B1 | 4/2003 | Alexander | |
| 6,571,355 B1 | 5/2003 | Linnell | |
| 6,583,902 B1 | 6/2003 | Yuen | |
| 6,633,761 B1 | 10/2003 | Singhal | |
| 6,636,963 B1 | 10/2003 | Stein | |
| 6,771,610 B1 | 8/2004 | Seaman | |
| 6,873,602 B1 | 3/2005 | Ambe | |
| 6,937,576 B1 | 8/2005 | DiBenedetto | |
| 6,956,824 B2 | 10/2005 | Mark | |
| 6,957,269 B2 | 10/2005 | Williams | |
| 6,975,581 B1 | 12/2005 | Medina | |
| 6,975,864 B2 | 12/2005 | Singhal | |
| 7,016,352 B1 | 3/2006 | Chow | |
| 7,061,877 B1 | 6/2006 | Gummalla | |
| 7,062,177 B1 | 6/2006 | Grivna | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 | 1/2008 | Chowdhury | |
| 7,316,031 B2 | 1/2008 | Griffith | |
| 7,330,897 B2 | 2/2008 | Baldwin | |
| 7,380,025 B1 | 5/2008 | Riggins | |
| 7,397,794 B1 | 7/2008 | Lacroute | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1 | 7/2009 | Kuo | |
| 7,558,273 B1 | 7/2009 | Grosser, Jr. | |
| 7,571,447 B2 | 8/2009 | Ally | |
| 7,599,901 B2 | 10/2009 | Mital | |
| 7,688,736 B1 | 3/2010 | Walsh | |
| 7,688,960 B1 | 3/2010 | Aubuchon | |
| 7,690,040 B2 | 3/2010 | Frattura | |
| 7,706,255 B1 | 4/2010 | Kondrat et al. | |
| 7,716,370 B1 | 5/2010 | Devarapalli | |
| 7,720,076 B2 | 5/2010 | Dobbins | |
| 7,729,296 B1 | 6/2010 | Choudhary | |
| 7,787,480 B1 | 8/2010 | Mehta | |
| 7,792,920 B2 | 9/2010 | Istvan | |
| 7,796,593 B1 | 9/2010 | Ghosh | |
| 7,801,021 B1 | 9/2010 | Triantafillis | |
| 7,808,992 B2 | 10/2010 | Homchaudhuri | |
| 7,836,332 B2 | 11/2010 | Hara | |
| 7,843,906 B1 | 11/2010 | Chidambaram et al. | |
| 7,843,907 B1 | 11/2010 | Abou-Emara | |
| 7,860,097 B1 | 12/2010 | Lovett | |
| 7,898,959 B1 | 3/2011 | Arad | |
| 7,912,091 B1 | 3/2011 | Krishnan | |
| 7,924,837 B1 | 4/2011 | Shabtay | |
| 7,937,756 B2 | 5/2011 | Kay | |
| 7,945,941 B2 | 5/2011 | Sinha | |
| 7,949,638 B1 | 5/2011 | Goodson | |
| 7,957,386 B1 | 6/2011 | Aggarwal | |
| 8,018,938 B1 | 9/2011 | Fromm | |
| 8,027,354 B1 | 9/2011 | Portolani | |
| 8,054,832 B1 | 11/2011 | Shukla | |
| 8,068,442 B1 | 11/2011 | Kompella | |
| 8,078,704 B2 | 12/2011 | Lee | |
| 8,090,805 B1 * | 1/2012 | Chawla | H04L 12/00 709/221 |
| 8,102,781 B2 | 1/2012 | Smith | |
| 8,102,791 B2 | 1/2012 | Tang | |
| 8,116,307 B1 | 2/2012 | Thesayi | |
| 8,125,928 B2 * | 2/2012 | Mehta et al. | 370/254 |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,175,107 B1 | 5/2012 | Yalagandula | |
| 8,194,674 B1 | 6/2012 | Pagel | |
| 8,195,774 B2 | 6/2012 | Lambeth | |
| 8,204,061 B1 | 6/2012 | Sane | |
| 8,213,313 B1 | 7/2012 | Doiron | |
| 8,213,336 B2 | 7/2012 | Smith | |
| 8,230,069 B2 | 7/2012 | Korupolu | |
| 8,239,960 B2 | 8/2012 | Frattura | |
| 8,249,069 B2 * | 8/2012 | Raman et al. | 370/390 |
| 8,270,401 B1 | 9/2012 | Barnes | |
| 8,295,291 B1 | 10/2012 | Ramanathan | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake | |
| 8,369,335 B2 | 2/2013 | Jha | |
| 8,369,347 B2 | 2/2013 | Xiong | |
| 8,392,496 B2 | 3/2013 | Linden | |
| 8,451,717 B2 * | 5/2013 | Venkataraman | H04L 12/1877 370/225 |
| 8,462,774 B2 | 6/2013 | Page | |
| 8,467,375 B2 | 6/2013 | Blair | |
| 8,520,595 B2 | 8/2013 | Yadav | |
| 8,599,850 B2 | 12/2013 | Jha | |
| 8,599,864 B2 | 12/2013 | Chung | |
| 8,615,008 B2 | 12/2013 | Natarajan | |
| 8,706,905 B1 | 4/2014 | McGlaughlin | |
| 8,724,456 B1 | 5/2014 | Hong | |
| 8,798,045 B1 | 8/2014 | Aybay | |
| 8,806,031 B1 | 8/2014 | Kondur | |
| 8,826,385 B2 | 9/2014 | Congdon | |
| 8,918,631 B1 | 12/2014 | Kumar | |
| 8,937,865 B1 | 1/2015 | Kumar | |
| 8,995,272 B2 | 3/2015 | Agarwal | |
| 9,350,680 B2 | 5/2016 | Thayalan | |
| 2001/0005527 A1 | 6/2001 | Vaeth | |
| 2001/0055274 A1 | 12/2001 | Hegge | |
| 2002/0019904 A1 | 2/2002 | Katz | |
| 2002/0021701 A1 | 2/2002 | Lavian | |
| 2002/0039350 A1 | 4/2002 | Wang | |
| 2002/0054593 A1 | 5/2002 | Morohashi | |
| 2002/0091795 A1 | 7/2002 | Yip | |
| 2003/0041085 A1 | 2/2003 | Sato | |
| 2003/0093567 A1 | 5/2003 | Lolayekar | |
| 2003/0097464 A1 | 5/2003 | Martinez | |
| 2003/0123393 A1 | 7/2003 | Feuerstraeter | |
| 2003/0147385 A1 | 8/2003 | Montalvo | |
| 2003/0174706 A1 | 9/2003 | Shankar | |
| 2003/0189905 A1 | 10/2003 | Lee | |
| 2003/0189930 A1 | 10/2003 | Terrell | |
| 2003/0208616 A1 | 11/2003 | Laing | |
| 2003/0216143 A1 | 11/2003 | Roese | |
| 2003/0223428 A1 | 12/2003 | BlanquerGonzalez | |
| 2003/0233534 A1 | 12/2003 | Bernhard | |
| 2004/0001433 A1 | 1/2004 | Gram | |
| 2004/0003094 A1 | 1/2004 | See | |
| 2004/0010600 A1 | 1/2004 | Baldwin | |
| 2004/0049699 A1 | 3/2004 | Griffith | |

(56) References Cited

U.S. PATENT DOCUMENTS

| | | |
|---|---|---|
| 2004/0057430 A1 | 3/2004 | Paavolainen |
| 2004/0081171 A1 | 4/2004 | Finn |
| 2004/0088668 A1 | 5/2004 | Hamlin |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0243673 A1 | 12/2004 | Goyal |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0093254 A1 | 5/2006 | Mozdy |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0220059 A1 | 9/2007 | Lu |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida Ruah |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |

(56) References Cited

U.S. PATENT DOCUMENTS

| | | |
|---|---|---|
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0055274 A1 | 3/2011 | Scales |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe et al. |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1* | 7/2012 | Kern ............... H04M 3/561 370/260 |
| 2012/0177039 A1 | 7/2012 | Berman |
| 2012/0210416 A1 | 8/2012 | Mihelich |
| 2012/0221636 A1 | 8/2012 | Surtani |
| 2012/0239918 A1 | 9/2012 | Huang |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |

(56) References Cited

U.S. PATENT DOCUMENTS

| | | |
|---|---|---|
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0066947 A1 | 3/2013 | Ahmad |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0064056 A1 | 3/2014 | Sakata |
| 2014/0105034 A1 | 4/2014 | Sun |
| 2014/0157251 A1 | 6/2014 | Hocker |
| 2014/0298091 A1 | 10/2014 | Carlen |
| 2014/0355477 A1 | 12/2014 | Velayudhan |
| 2015/0010007 A1 | 1/2015 | Matsuhira |
| 2015/0030031 A1 | 1/2015 | Zhou |
| 2015/0127618 A1 | 5/2015 | Alberti |
| 2015/0143369 A1 | 5/2015 | Zheng |
| 2015/0172098 A1 | 6/2015 | Agarwal |
| 2015/0195093 A1 | 7/2015 | Mahadevan |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |

FOREIGN PATENT DOCUMENTS

| | | |
|---|---|---|
| EP | 0579567 A2 | 1/1994 |
| EP | 0993156 A2 | 12/2000 |
| EP | 1398920 A2 | 3/2004 |
| EP | 1916807 A2 | 4/2008 |
| EP | 2001167 A1 | 12/2008 |
| EP | 2874359 | 5/2015 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Knight, S. et al. "Virtual Router Redundancy Protocol", Apr. 1998, XP-002135272.

Eastlake, Donald et al., "RBridges: TRILL Header Options", Dec. 2009.

Touch, J. et al., "Transparent Interconnection of Lots of Links (TRILL): Problem and Applicability Statement", May 2009.

Perlman, Radia et al., "RBridge VLAN Mapping", Dec. 2009.

"Brocade Fabric OS (FOS) 6.2 Virtual Fabrics Feature Frequently Asked Questions".

Perlman, Radia "Challenges and Opportunities in the Design of TRILL: a Routed layer 2 Technology", XP-002649647, 2009.

Nadas, S. et al., "Virtual Router Redundancy Protocol (VRRP) Version 3 for IPv4 and IPv6", Mar. 2010.

Perlman, Radia et al., "RBridges: Base Protocol Specification", Mar. 2010.

Christensen, M. et al., "Considerations for Internet Group Management Protocol (IGMP) and Multicast Listener Discovery (MLD) Snooping Switches", May 2006.

"Switched Virtual Internetworking moved beyond bridges and routers", 8178 Data Communications (Sep. 23, 1994), No. 12, New York.

S. Night et al., "Virtual Router Redundancy Protocol", Network Working Group, XP-002135272, Apr. 1998.

Eastlake 3rd., Donald et al., "RBridges: TRILL Header Options", Draft-ietf-trill-rbridge-options-00.txt, Dec. 24, 2009.

J. Touch, et al., "Transparent Interconnection of Lots of Links (TRILL): Problem and Applicability Statement", May 2009.

Perlman, Radia et al., "RBridge VLAN Mapping", Draft-ietf-trill-rbridge-vlan-mapping-01.txt, Dec. 4, 2009.

Brocade Fabric OS (FOS) 6.2 Virtual Fabrics Feature Frequently Asked Questions.

Perlman, Radia et al., "RBridges: Base Protocol Specification", draft-ietf-trill-rbridge-protocol-16.txt, Mar. 3, 2010.

Lapuh, Roger et al., "Split Multi-link Trunking (SMLT)", Oct. 2002.

Lapuh, Roger et al., "Split Multi-link Trunking (SMLT) draft-lapuh-network-smlt-08", 2008.

Office Action for U.S. Appl. No. 13/312,903, filed Dec. 6, 2011, from Qin, Zhiren, dated Nov. 12, 2013.

Office Action for U.S. Appl. No. 13/092,873, filed Apr. 22, 2011, from Patel, Parthkumar, dated Nov. 29, 2013.

Office Action for U.S. Appl. No. 13/184,526, filed Jul. 16, 2011, from Vu, Viet Duy, dated Dec. 2, 2013.

Office Action for U.S. Appl. No. 13/092,580, filed Apr. 22, 2011, from Kavleski, Ryan C., dated Jan. 10, 2014.

Office Action for U.S. Appl. No. 13/092,877, filed Apr. 22, 2011, from Patel, Parthkumar, dated Jan. 6, 2014.

Office Action for U.S. Appl. No. 13/598,204, filed Aug. 29, 2012, from Pascual Peguero, Natali, dated Feb. 20, 2014.

Zhai F. Hu et al. "RBridge: Pseudo-Nickname; draft-hu-trill-pseudonode-nickname-02.txt", May 15, 2012.

Huang, Nen-Fu et al., "An Effective Spanning Tree Algorithm for a Bridged LAN", Mar. 16, 1992.

Office Action dated Jun. 6, 2014, U.S. Appl. No. 13/669,357, filed Nov. 5, 2012.

Office Action dated Feb. 20, 2014, U.S. Appl. No. 13/598,204, filed Aug. 29, 2012.

U.S. Appl. No. Office Action dated May 14, 2014, U.S. Appl. No. 13/533,843, filed Jun. 26, 2012.

Office Action dated May 9, 2014, U.S. Appl. No. 13/484,072, filed May 30, 2012.

Office Action dated Feb. 28, 2014, U.S. Appl. No. 13/351,513, filed Jan. 17, 2012.

Office Action dated Jun. 18, 2014, U.S. Appl. No. 13/440,861, filed Apr. 5, 2012.

Office Action dated Mar. 6, 2014, U.S. Appl. No. 13/425,238, filed Mar. 20, 2012.

(56) References Cited

OTHER PUBLICATIONS

Office Action dated Jun. 20, 2014, U.S. Appl. No. 13/092,701, filed Apr. 22, 2011.
Office Action dated Apr. 9, 2014, U.S. Appl. No. 13/092,752, filed Apr. 22, 2011.
Brocade Unveils, "The Effortless Network" Mar. 2012.
Foundary FastIron Configuration Guide, Software Release FSX 04.2.00b, Software Release FWS 04.3.00, Software Release FGS 05.0.00a, Sep. 2008.
Brocade, "FastIron and TurboIron 24x Configuration Guide", Feb. 16, 2010.
Brocade, "FastIron Configuration Guide" Dec. 18, 2009.
Brocade, "The Effortless Network: Hyperedge Technology for the Campus LAN" 2012.
Narten, T. et al., "Problem Statement: Overlays for Network Virtualization draft-narten-nvo3-overlay-problem-statement-01", Oct. 31, 2011.
Knight, Paul et al., "Layer 2 and 3 Virtual Private Networks: Taxonomy, Technology, and Standardization Efforts", Jun. 2004.
Brocade "An Introduction to Brocade VCS Fabric Technology", Dec. 3, 2012.
Kreeger, L. et al., "Network Virtualization Overlay Control Protocol Requirements draft-kreeger-nvo3-overlay-cp-00", Jan. 30, 2012.
Knight, Paul et al., "Network Based IP VPN Architecture using Virtual Routers", May 2003.
Louati, Wajdi et al., "Network-Based Virtual Personal Overlay Networks Using Programmable Virtual Routers", Jul. 2005.
Office Action for U.S. Appl. No. 13/087,239, filed Apr. 14, 2011, Man U., dated May 22, 2013.
Office Action for U.S. Appl. No. 13/098,490, filed May 2, 2011, from Wyllie, Christopher T., dated Jul. 9, 2013.
Office Action for U.S. Appl. No. 13/092,724, filed Apr. 22, 2011, from Park, Jung H., dated Feb. 5, 2013.
Office Action for U.S. Appl. No. 13/092,724, filed Apr. 22, 2011, from Park, Jung H., dated Jul. 16, 2013.
Office Action for U.S. Appl. No. 13/092,580, filed Apr. 22, 2011, from Kavleski, Ryan C., dated Jun. 10, 2013.
Office Action for U.S. Appl. No. 13/042,259, filed Mar. 7, 2011, from Jaroenchonwanit, Bunjob, dated Mar. 18, 2013.
Office Action for U.S. Appl. No. 13/092,460, filed Apr. 22, 2011, from Chang, Richard K., dated Jun. 21, 2013.
Office Action for U.S. Appl. No. 13/042,259, filed Mar. 7, 2011, from Jaroenchonwanit, Bunjob, dated Jul. 31, 2013.
Office Action for U.S. Appl. No. 13/092,701, filed Apr. 22, 2011, from Park, Jung H., dated Jan. 28, 2013.
Office Action for U.S. Appl. No. 13/092,701, filed Apr. 22, 2011, from Park. Jung H., dated Jul. 3, 2013.
Office Action for U.S. Appl. No. 13/092,752, filed Apr. 22, 2011, from Park, Jung H., dated Feb. 5, 2013.
Office Action for U.S. Appl. No. 13/092,752, filed Apr. 22, 2011, from Park, Jung H., dated Jul. 18, 2013.
Office Action for U.S. Appl. No. 13/950,974, filed Nov. 19, 2010, from Haile, Awet A., dated Dec. 2, 2012.
Office Action for U.S. Appl. No. 12/950,974, filed Nov. 19, 2010, from Haile, Awet A., dated May 24, 2012.
Office Action for U.S. Appl. No. 13/092,877, filed Apr. 22, 2011, from Patel, Parthkumar, dated Mar. 4, 2013.
Office Action for U.S. Appl. No. 13/092,877, filed Apr. 22, 2011, from Patel, Parthkumar, dated Sep. 5, 2013.
Office Action for U.S. Appl. No. 12/950,968, filed Nov. 19, 2010, from Haile, Awet A., dated Jun. 7, 2012.
Office Action for U.S. Appl. No. 12/950,968, filed Nov. 19, 2010, from Haile, Awet A., dated Jan. 4, 2013.
Office Action for U.S. Appl. No. 13/092,864, filed Apr. 22, 2011, from Huang, Weibin, dated Sep. 19, 2012.
Office Action for U.S. Appl. No. 13/098,360, filed Apr. 29, 2011, from Lo, Diane Lee, dated May 31, 2013.
Office Action for U.S. Appl. No. 13/044,326, filed Mar. 9, 2011, from Ghafoerkhan, Faiyazkhan, dated Oct. 2, 2013.
Office Action for U.S. Appl. No. 13/030,806, filed Feb. 18, 2011, from Ambaye, Mewale A., dated Dec. 3, 2012.
Office Action for U.S. Appl. No. 13/030,806, filed Feb. 18, 2011, from Ambaye, Mewale A., dated Jun. 11, 2013.
Office Action for U.S. Appl. No. 13/030,688, filed Feb. 18, 2011, from Mansoury, Nourali, dated Apr. 25, 2013.
Office Action for U.S. Appl. No. 13/044,301, filed Mar. 9, 2011, from Weidner, Timothy J., dated Jun. 11, 2013.
Office Action for U.S. Appl. No. 13/044,301, filed Mar. 9, 2011, from Weidner, Timothy J., dated Feb. 22, 2013.
Office Action for U.S. Appl. No. 13/050,102, filed Mar. 17, 2011, from Preval, Lionel, dated Oct. 26, 2012.
Office Action for U.S. Appl. No. 13/050,102, filed Mar. 17, 2011, from Preval, Lionel, dated May 16, 2013.
Office Action for U.S. Appl. No. 13/184,526, filed Jul. 16, 2011, from Vu, Viet Duy, dated Jan. 28, 2013.
Office Action for U.S. Appl. No. 13/184,526, filed Jul. 16, 2011, from Vu, Viet Duy, dated May 22, 2013.
Office Action for U.S. Appl. No. 13/092,873, filed Apr. 22, 2011, from Patel, Parthkumar, dated Jun. 19, 2013.
Office Action for U.S. Appl. No. 13/365,993, filed Feb. 3, 2012, from Cho, Hong Sol., dated Jul. 23, 2013.
Office Action for U.S. Appl. No. 13/365,808, filed Feb. 3, 2012, from Cho, Hong Sol., dated Jul. 18, 2013.
Office Action for U.S. Appl. No. 13/312,903, filed Dec. 6, 2011, from Qin, Zhiren, dated Jun. 13, 2013.
Office Action for U.S. Appl. No. 13/533,843, filed Jun. 26, 2012, from Lee, Chi Ho A., dated Oct. 21, 2013.
'An Introduction to Brocade VCS Fabric Technology', BROCADE white paper, http://community.brocade.com/docs/DOC-2954, Dec. 3, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
U.S. Appl. No. 13/030,806 Office Action dated Dec. 3, 2012.
Office action dated Mar. 27, 2014, U.S. Appl. No. 13/098,490, filed May 2, 2011.
Office action dated Jun. 8, 2015, U.S. Appl. No. 14/178,042, filed Feb. 11, 2014.
Office action dated Apr. 9, 2014, U.S. Appl. No. 13/092,724, filed Apr. 22, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Aug. 14, 2014, U.S. Appl. No. 13/092,460, filed Apr. 22, 2011.
Office action dated Mar. 26, 2014, U.S. Appl. No. 13/092,701, filed Apr. 22, 2011.
Office action dated Oct. 2, 2014, for U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office action dated Apr. 22, 2014, U.S. Appl. No. 13/030,806, filed Feb. 18, 2011.
Office action dated Aug. 4, 2014, U.S. Appl. No. 13/050,102, filed Mar. 17, 2011.
Office action dated Aug. 21, 2014, U.S. Appl. No. 13/184,526, filed Jul. 16, 2011.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015 U.S. Appl. No. 13/656,438, filed Oct. 19, 2012.

(56) References Cited

OTHER PUBLICATIONS

Office Action Dated Jun. 10, 2015, U.S. Appl. No. 13/890,150, filed May 8, 2013.
FastIron Configuration Guide Supporting Ironware Software Release 07.0.00, Dec. 18, 2009.
Kompella, Ed K. et al., 'Virtual Private LAN Service (VPLS) Using BGP for Auto-Discovery and Signaling' Jan. 2007.
Lapuh, Roger et al., 'Split Multi-link Trunking (SMLT) draft-lapuh-network-smlt-08', Jan. 2009.
Mahalingam "VXLAN: A Framework for Overlaying Virtualized Layer 2 Networks over Layer 3 Networks" Oct. 17, 2013 pp. 1-22, Sections 1, 4 and 4.1.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Feb. 23, 2015.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/044,301, filed Mar. 9, 2011, dated Jan. 29, 2015.
Office Action for U.S. Appl. No. 13/044,301, dated Mar. 9, 2011.
Office Action for U.S. Appl. No. 13/050,102, filed Mar. 17, 2011, dated Jan. 26, 2015.
Office Action for U.S. Appl. No. 13/087,239, filed Apr. 14, 2011, dated Dec. 5, 2012.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 29, 2013.
Office Action for U.S. Appl. No. 13/092,873, filed Apr. 22, 2011, dated Nov. 7, 2014.
Office Action for U.S. Appl. No. 13/092,877, filed Apr. 22, 2011, Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/365,808, filed Jul. 18, 2013, dated Jul. 18, 2013.
Office Action for U.S. Appl. No. 13/425,238, filed Mar. 20, 2012, dated Mar. 12, 2015.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for U.S. Appl. No. 13/851,026, filed Mar. 26, 2013, dated Jan. 30, 2015.
Office Action for U.S. Appl. No. 14/577,785, filed Dec. 19, 2014, dated Apr. 13, 2015.
Office Action for U.S. Appl. No. 13/092,887, dated Jan. 6, 2014.

(56) References Cited

OTHER PUBLICATIONS

Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].
Rosen, E. et al., "BGP/MPLS VPNs", Mar. 1999.
Siamak Azodolmolky et al. "Cloud computing networking: Challenges and opportunities for innovations", IEEE Communications Magazine, vol. 51, No. 7, Jul. 1, 2013.
TRILL Working Group Internet-Draft Intended status: Proposed Standard RBridges: Base Protocol Specificaiton Mar. 3, 2010.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.

* cited by examiner

SUPPORTING MULTIPLE MULTICAST TREES IN TRILL NETWORKS

RELATED APPLICATION

This application claims priority to U.S. Provisional Application No. 61/352,726, entitled "TRILL Multicast Trees," by inventors Shunjia Yu, Raj Venkatesan, Anoop Ghanwani, Phanidhar Koganti, Mythilikanth Raman, Rajiv Krishnamurthy, and Dilip Chatwani, filed 8 Jun. 2010, the contents of which are incorporated herein by reference.

This application also claims priority to U.S. Provisional Application No. 61/427,057, entitled "Supporting Multiple Multicast Trees in TRILL Networks," by inventors Shunjia Yu, Nagarajan Venkatesan, Anoop Ghanwani, Phanidhar Koganti, Mythilikanth Raman, Rajiv Krishnamurthy, and Dilip Chatwani, filed 23 Dec. 2010, the contents of which are incorporated herein by reference.

BACKGROUND

Technical Field

This disclosure relates to data communication and networking More specifically, this disclosure relates to systems and techniques for supporting multiple multicast trees in TRILL (Transparent Interconnection of Lots of Links) networks.

Related Art

The insatiable demand for bandwidth and the ever increasing size and complexity of computer networks has created a need for increasing the bandwidth and improving manageability of computer networks.

Computer networks often use multicasting to efficiently distribute high bandwidth content (e.g., streaming video) to multiple end-hosts in the network. In multicasting, copies of packets are forwarded over a multicast tree in the network. In some approaches, the network supports a single multicast tree for a given source and multicast address. For purposes of load balancing and failure recovery, it is generally desirable to support multiple multicast trees for a given source and multicast address. Unfortunately, supporting multiple multicast trees in the network can significantly increase the amount of resources required at each switch.

SUMMARY

Some embodiments of the present invention provide systems and techniques for efficiently supporting multiple multicast trees for a given source and multicast address. Specifically, some embodiments provide a system (e.g., a switch) that can determine an internal multicast group identifier based on a source address, a multicast address, and a multicast tree identifier field associated with a multicast packet. The multicast packet can be an Ethernet or TRILL multicast packet. The system can then forward the multicast packet based on the internal multicast group identifier. In this disclosure, unless otherwise stated, the phrase "based on" means "based solely or partly on."

In some embodiments, the system can determine a first set of bits based on the source address and the multicast address of the multicast packet, and a second set of bits based on the multicast tree identifier field of the multicast packet. The system can then combine (e.g., concatenate) the first set of bits and the second set of bits to obtain the internal multicast group identifier.

The system can forward the multicast packet by determining a set of egress ports based on the internal multicast group identifier, and sending at least one copy of the multicast packet through each port in the set of egress ports. Note that multiple copies of the multicast packet may be sent over the same egress port if the multicast packet is to be forwarded to multiple Virtual Private Networks (VPNs) coupled to the egress port.

If the multicast packet is an Ethernet packet, the system can add a TRILL header to each copy of the multicast packet, and forward the TRILL-encapsulated packets based on the internal multicast group identifier.

In some embodiments, the scope of an internal multicast group identifier does not extend beyond a switch. As a packet traverses through different switches in the network, each switch can determine a different internal multicast group identifier.

Some embodiments of the present invention provide a network which includes at least one source switch, one or more intermediate switches, and at least one destination switch. A source switch may determine an internal multicast group identifier for a multicast packet based on one or more fields in the packet's header. Next, the source switch may encapsulate a copy of the multicast packet in a TRILL multicast packet, and forward the TRILL multicast packet based on the internal multicast group identifier.

The TRILL multicast packet may pass through one or more intermediate switches before reaching the destination switch. Each intermediate switch may determine an internal multicast group identifier, and forward the TRILL multicast packet based on the internal multicast group identifier. When the TRILL multicast packet reaches the destination switch, the destination switch may decapsulate the TRILL multicast packet to obtain the multicast packet, and forward the multicast packet based on an internal multicast group identifier. The internal multicast group identifier determined by a switch may or may not be the same as the internal multicast group identifiers that were determined by other switches that processed the multicast packet or the TRILL multicast packet.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

TRILL (Transparent Interconnection of Lots of Links)

TRILL combines the advantages of bridging and routing. Bridges (e.g., devices that perform layer-2 forwarding) can transparently connect multiple links to create a single local area network. However, the topology on which traffic is forwarded in a bridged network must be a tree to prevent loops. Unfortunately, forwarding the traffic over a tree causes traffic concentration on the links that correspond to the tree edges, leaving other links completely unutilized. Unlike bridges, Internet Protocol (IP) routers (e.g., devices that perform IP forwarding) do not need to create a spanning tree for forwarding traffic. However, routers that forward IP traffic require more configuration than bridges, and moving nodes in an IP network requires changing the IP address of the nodes. Each link in an IP network is associated with an address prefix, and all nodes on that link must have that IP prefix. If a node moves to another link that has a different IP prefix, the node must change its IP address. Unless otherwise stated, the term "IP" refers to both "IPv4" and "IPv6" in this disclosure.

A TRILL network includes "routing bridges" (referred to as RBridges) which route packets, but like bridges, learn layer-2 address locations through receipt of packets. Since packets are routed, packet forwarding is not limited to a spanning tree. Also, since a hop count is included in a TRILL packet, packets do not circulate forever in the network in the presence of loops. Further, since the layer-2 address locations are learned, a TRILL network allows IP nodes to move from one link to another in the network without any restrictions.

Figure 1:
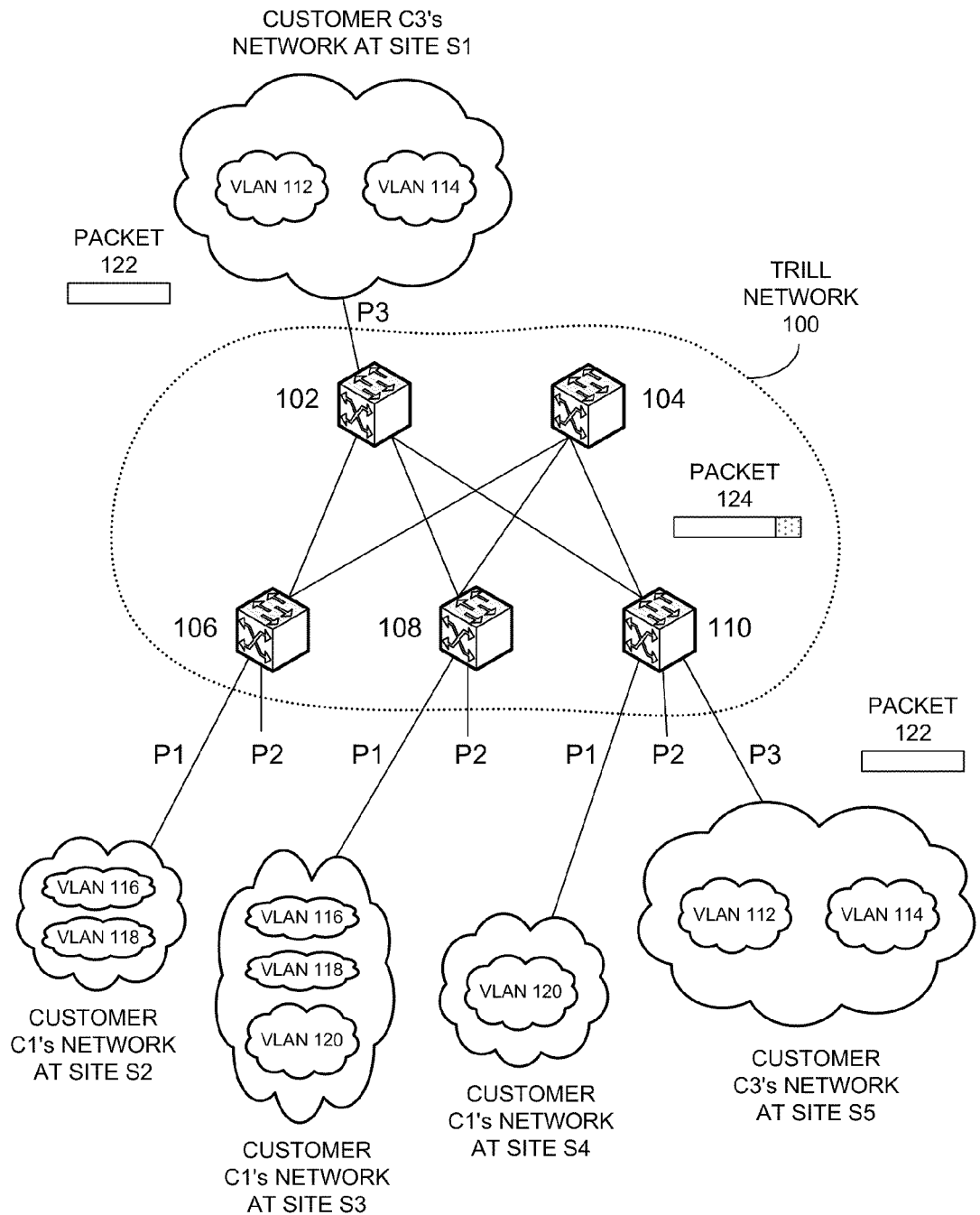
FIG. 1 illustrates a TRILL network in accordance with some embodiments of the present invention.

FIG. 1 illustrates a TRILL network in accordance with some embodiments of the present invention. TRILL network 100 can be a service provider's network which includes core RBridges 102 and 104 and edge RBridges 106, 108, and 110. RBridges 102, 106, 108, and 110 are coupled to customer devices, whereas RBridge 104 is not. Specifically, port P3 on RBridge 102 can be coupled to a device in customer C3's network at site S1; ports labeled P1 on RBridges 106, 108, and 110 can be coupled to devices in customer C1's networks at sites S2, S3, and S4, respectively; and port P3 on RBridge 110 can be coupled to a device in customer C3's network at site S5. Note that the port numbers in FIG. 1 match the customer numbers, i.e., ports labeled P1 are associated with customer C1, ports labeled P3 are associated with customer C3, etc. This has been done for ease of discourse. In general, any port on any RBridge can potentially be assigned to one or more virtual networks that are associated with one or more customers.

A virtual local area network (VLAN) in a customer's network may span multiple customer sites. For example, VLANs 112 and 114 in customer C3's network include nodes in sites S1 and S5. Similarly, VLANs 116 and 118 in customer C1's network include nodes in sites S2 and S3, and VLAN 120 in customer C1's network includes nodes in sites S3 and S4.

Nodes that belong to the same VLAN, but which are located at different sites, can communicate with each other transparently through TRILL network 100. Specifically, the ingress RBridge can encapsulate a packet (e.g., an Ethernet packet with or without one or more VLAN tags) received from a customer and route the packet within TRILL network 100 using a TRILL header. The egress RBridge can then strip the TRILL header and send the original customer packet on the appropriate port. For example, packet 122 can originate in customer C3's network at site S1, and be received on port P3 of RBridge 102 with a VLAN tag associated with VLAN 112. Next, RBridge 102, which is the ingress RBridge for this packet, can encapsulate packet 122 by adding a TRILL header to obtain packet 124 (the TRILL header is the shaded portion in packet 124). Next, the TRILL header of packet 124 can be used to route packet 124 through TRILL network 100 until packet 124 reaches RBridge 110, which is the egress RBridge for the packet. RBridge 110 can then strip away the TRILL header on packet 124 to obtain the original packet 122, and send packet 122 on port P3 so that the packet can be delivered to the intended destination in VLAN 112 in customer C3's network at site S5. In FIG. 1, the packet that is received at the ingress RBridge and the packet that is sent from the egress RBridge are shown to be the same. However, these packets can be different. For example, if VLAN translation is being performed, then the packet that is received at the ingress RBridge and the packet that is sent from the egress RBridge can have different VLAN tags.

Further details on TRILL and RBridges can be found in Radia Perlman, *Rbridges: Transparent Routing*, Proceedings of IEEE INFOCOM, 2004, which is incorporated herein by reference. Details on TRILL and RBridges can also be found in Joe Touch and Radia Perlman, *TRILL: Problem and Applicability*, IETF RFC 5556, May 2009, which is incorporated herein by reference. Details of the TRILL packet format and RBridge forwarding can be found in IETF draft "RBridges: Base Protocol Specification," available at http://tools.ietf.org/html/draft-ietf-trill-rbridge-protocol-16, which is incorporated herein by reference.

Although some examples in this disclosure are presented in the context of a TRILL network that includes RBridges, the present invention is not limited to TRILL networks or RBridges. The terms "frame" or "packet" generally refer to a group of bits. The use of the term "frame" is not intended to limit the present invention to layer-2 networks. Similarly, the use of the term "packet" is not intended to limit the present invention to layer-3 networks. Unless otherwise stated, the terms "frame" or "packet" may be substituted with other terms that refer to a group of bits, such as "cell" or "datagram."

Network Virtualization

Network virtualization enables a service provider to provision virtual networks (VNs) over a common network infrastructure. To a user on a VN it appears as if the traffic is being carried over a separate network that has been specifically built for the user. However, in reality, the traffic from multiple VNs may be carried over a common network infrastructure.

Network virtualization has many uses. For example, network virtualization can be used to create multiple, logically distinct networks on the same physical network to comply with government regulations. Other uses of network virtualization include, but are not limited to, partitioning network resources between different organizations in a company, reducing network costs and simplifying network management during a merger between two companies by provisioning a virtual private network for each company.

One approach for supporting network virtualization is to duplicate resources (e.g., routers, switches, etc.) in the network so that the resources can be provisioned on a per-customer basis. However, this approach is impractical because it is costly and it is not scalable.

Some embodiments of the present invention implement network virtualization and/or partitioning in the TRILL network by embedding a VPN identifier in a TRILL option field in the TRILL header. Specifically, the ingress RBridge can determine a VPN identifier for each packet it receives from a customer, and embed the VPN identifier in a TRILL option field in the TRILL header. Next, the VPN identifier can be used to support network virtualization and/or partitioning in the TRILL network. Specifically, once the VPN identifier is embedded into the TRILL header, RBridges in the TRILL network can use the VPN identifier to determine how to handle the packet.

In some embodiments, the system can use a service provider VLAN identifier to implement network virtualization and/or partitioning. Specifically, ingress RBridges can add appropriate S-tags to packets received from customers (note that the S-tag based approach may not work for incoming packets that already have an S-tag). Next, the S-tag can be used to implement virtualization and/or partitioning in the network.

Packet Format

Figure 2:
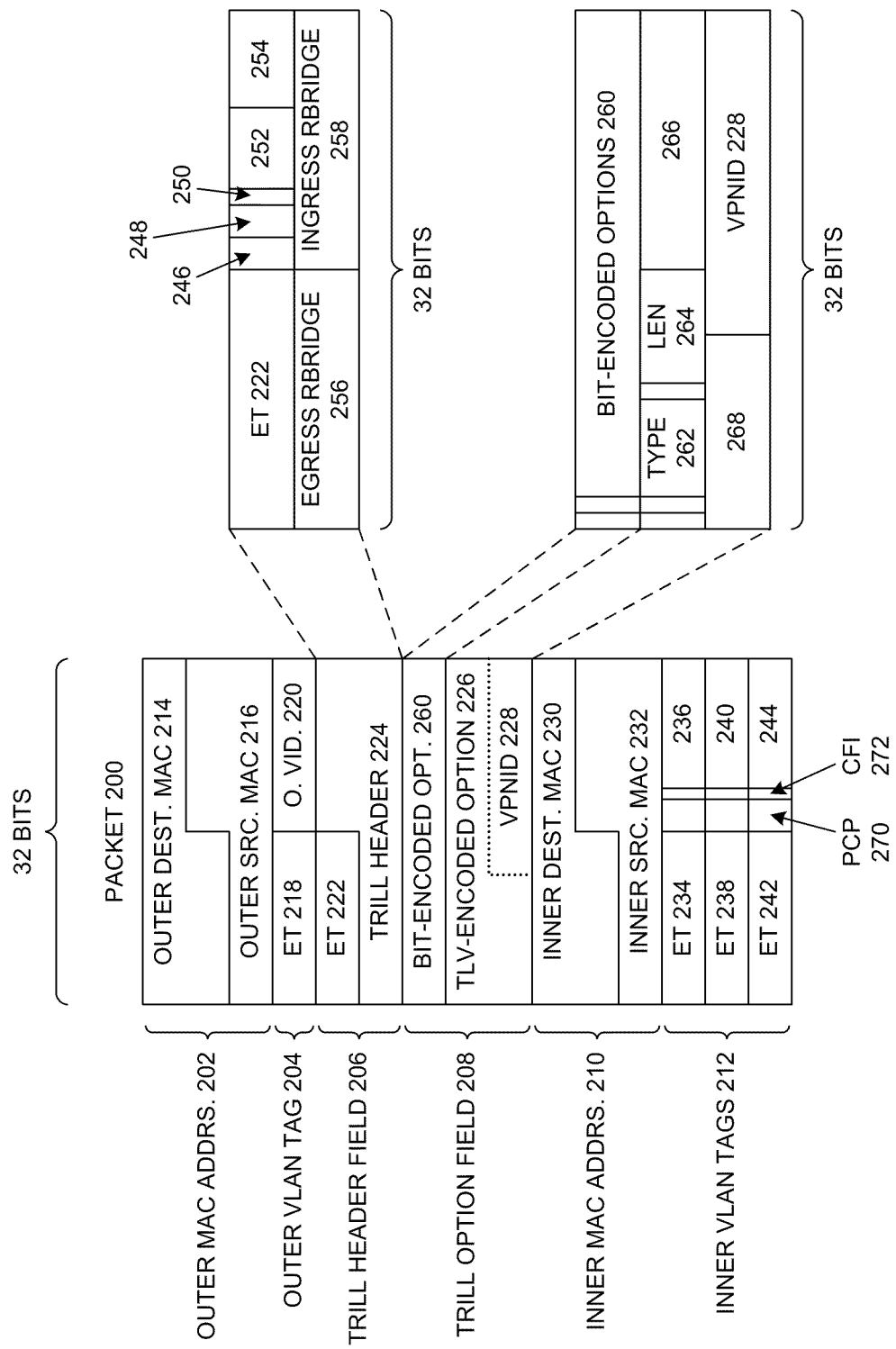
FIG. 2 illustrates a portion of an Ethernet packet which includes a TRILL header in accordance with some embodiments of the present invention.

FIG. 2 illustrates a portion of an Ethernet packet which includes a TRILL header in accordance with some embodiments of the present invention. The packet shown in FIG. 2 is for illustration purposes only, and is not intended to limit the present invention.

Packet 200 can include one or more of the following fields: outer MAC (medium access control) addresses 202, outer VLAN tag 204, TRILL header field 206, TRILL option field 208, inner MAC addresses 210, and inner VLAN tags 212. Typically, the packet is transmitted from top to bottom, i.e., the bits associated with outer MAC addresses 202 will appear on the transmission medium before the bits associated with outer VLAN tag 204 appear on the transmission medium, and so forth. The contents of these fields and their uses are discussed below.

Outer MAC addresses 202 can include outer destination MAC address 214 and outer source MAC address 216. These MAC addresses and outer VLAN tag 204 typically change at each TRILL hop as the packet traverses the service provider's network. Specifically, at each hop, outer source MAC address 216 is associated with the MAC address of the source node (e.g., RBridge) for that hop, outer destination MAC address 214 is associated with the MAC address of the destination node (e.g., RBridge) for that hop, and outer VLAN tag 204 is associated with the VLAN that includes the source node and the destination node for that hop.

Outer VLAN tag 204 can include Ethernet type field 218 and outer VLAN identifier 220. The value of Ethernet type field 218 can indicate that the next field is a VLAN identifier. VLAN identifier 220 can be used in the service provider's network to create multiple broadcast domains.

TRILL header field 206 can include Ethernet type field 222 and TRILL header 224. The value of Ethernet type field 222 can indicate that the next field is a TRILL header. TRILL header 224 can include information for routing the packet through a TRILL network that is embedded in the service provider's network. Specifically, as shown in FIG. 2, TRILL header 224 can include version field 246 which indicates the TRILL version, reserved field 248 which may be reserved for future use, multicast field 250 which indicates whether this packet is a multicast packet, TRILL option length 252 which indicates the length (in terms of 32-bit words) of any TRILL option field that follows the TRILL header, and hop count 254 which may be decremented at each RBridge as the packet traverses the service provider's network.

TRILL header 224 also includes egress RBridge nickname 256 and ingress RBridge nickname 258. Ingress RBridge nickname 258 corresponds to the ingress RBridge which receives the packet from the customer's network, and, for unicast packets, egress RBridge nickname 256 corresponds to the egress RBridge which sends the packet to the customer's network. For multicast packets, egress RBridge nickname 256 corresponds to the egress RBridge at the root of the multicast tree on which the packet is to be forwarded. For example, in FIG. 1, when packet 122 is received at ingress RBridge 102, ingress RBridge 102 can use the header information in packet 122 to determine that packet 122 needs to be routed to egress RBridge 110. Next, ingress RBridge 102 can add TRILL header field 206 to packet 122 to obtain packet 124. Specifically, RBridge 102 can set ingress RBridge nickname 258 in packet 124's TRILL header to RBridge 102's nickname, and set egress RBridge nickname 256 in packet 124's TRILL header to RBridge 110's nickname. RBridge 102 can then forward packet 124 based solely or partly on packet 124's TRILL header.

TRILL option field 208 can include bit-encoded options and one or more options encoded in a TLV (type-length-value) format. Specifically, TRILL option field 208 can include bit-encoded options 260 which are one-bit option flags, and TLV-encoded option 226. For example, a 20-bit VPN identifier can be encoded as a TLV-encoded option. Specifically, the value of type field 262 can indicate that this option specifies a VPN identifier. Length field 264 can indicate the length of the data portion of the TLV-encoded option in octets. In the packet shown in FIG. 2, TLV-encoded option 226 is used for specifying a 20-bit VPN identifier, and length field 264 is set to the value 0x6. The data portion of TLV-encoded option 226 begins immediately after length field 264. Specifically, in the packet shown in FIG. 2, the total length (in octets) of fields 266, 268, and 228 is equal to 0x6 as specified by length field 264. Further, as shown in FIG. 2, the last 20 bits of the data portion in TLV-encoded option 226 can be used for specifying VPN identifier 228.

Note that a 20-bit VPN identifier can be specified using a smaller data portion, e.g., only 0x3 octets instead of 0x6 octets. However, some embodiments use the following non-obvious insight: it may be desirable to align the 20-bit VPN identifier with the word boundary to simplify chip design and/or to improve performance. Thus, in some embodiments, 0x6 octets are used instead of 0x3 octets so that the 20-bit VPN identifier is aligned with a 32-bit word boundary. For example, as shown in FIG. 2, VPN identifier 228 is aligned with the 32-bit word boundary.

Inner MAC addresses 210 can include inner source MAC address 232 and inner destination MAC address 230. Inner MAC addresses 210 can be the MAC addresses that were present in the header of the packet that was received from the customer's network. For example, in FIG. 1, suppose a source node in VLAN 112 in customer C3's network at site S1 sends a packet to a destination node in VLAN 112 in customer C3's network at site S5. In this scenario, inner source MAC address 232 can correspond to the source node at site S1, and inner destination MAC address 230 can correspond to the destination node at site S5.

Inner VLAN tags 212 can include one or more VLAN tags that are used within the customer's network. For example, inner VLAN tags 212 can include an S-tag which includes Ethernet type field 234 and S-VLAN-identifier 236, a C-tag which includes Ethernet type field 238 and C-VLAN-identifier 240, and a congestion-notification-tag (CN-TAG) which includes Ethernet type field 242 and flow-identifier 244. Each VLAN tag can also include a three-bit Priority Code Point (PCP) field, e.g., PCP 270, and a one-bit Canonical Form Indicator (CFI) field, e.g., CFI 272. The values in Ethernet type fields 234, 238, and 242 can indicate that the tag includes a VLAN identifier for an S-tag, a VLAN identifier for the C-tag, and a flow-identifier, respectively. The S-tag and the C-tag can be used by the customer to create a stacked-VLAN architecture, e.g., as defined in the Provider Bridging standard. The S-tag may also be used by the service provider to implement network virtualization and/or partitioning. The congestion-notification-tag may be used by the customer to manage network congestion.

Note that a packet may or may not include all of the fields shown in FIG. 2. For example, in some embodiments, a packet may not include inner VLAN tags 212 and/or outer VLAN tag 204. Further, certain combinations of fields may not be allowed in some embodiments. For example, in some embodiments, a packet may include either an S-tag or a TRILL option field, but not both. Additionally, the values of some fields may be related to each other. For example, in some embodiments, S-VLAN-identifier 236 may be copied into the 12 least significant bits of VPNID 228.

VLAN tagging is specified in IEEE (Institute of Electrical and Electronics Engineers) standard IEEE 802.1Q. The original specification of this standard describes how a single VLAN tag can be added to an Ethernet packet to create multiple broadcast domains within the same local area network (LAN). The term "Q-in-Q tagging" (also referred to as "QinQ tagging") refers to an amendment of this standard which allows an S-VLAN tag (a service VLAN tag is sometimes referred to as a provider tag) to be stacked in a single Ethernet packet. Q-in-Q tagging enables a service provider to carry VLAN traffic from multiple customers on a shared Q-in-Q network infrastructure without restricting the VLAN address space available to each customer. Further details on Q-in-Q tagging can be found in the specification for standard IEEE 802.1ad. In some embodiments, the system can add a TRILL header to a Provider Bridging (Q-in-Q) packet. In these embodiments, the packet received from the customer network may include an S-tag. The service provider's network may then add a TRILL header to the packet. In some embodiments, the system may ensure that the priority bits in the outermost VLAN tag are the same as the priority bits in the S-tag.

Supporting Multiple Multicast Trees in TRILL Networks

When a multicast packet is received on an input port, the multicast packet header is processed by the switch to determine the set of output ports on which the multicast packet is to be forwarded. Oftentimes, the forwarding mechanism (e.g., an application-specific integrated circuit designed for performing forwarding look-ups) is the bottleneck in the data path. Consequently, increasing the processing speed and decreasing the size and complexity of the forwarding mechanism is usually very important.

One approach for supporting multiple multicast trees is to have multiple forwarding entries (e.g., one entry per multicast tree) in the forwarding table for a given source address and multicast group address. Unfortunately, this approach can substantially increase the size of the forwarding table or severely limit the number of multicast groups that can be supported by the forwarding table.

Some embodiments determine an internal multicast group identifier based on one or more fields in the multicast packet's header. The multicast group identifier is then used to determine a set of egress ports through which the multicast packet is to be forwarded.

Figure 3A:
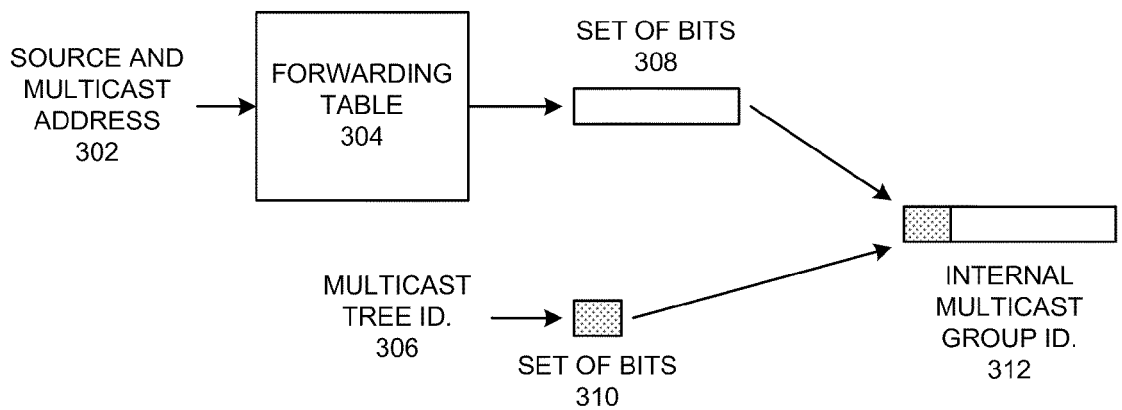
FIG. 3A illustrates how an internal multicast group identifier can be determined in accordance with some embodiments of the present invention.

FIG. 3A illustrates how an internal multicast group identifier can be determined in accordance with some embodiments of the present invention.

Internal multicast group identifier 312 is composed of two sets of bits. The first set of bits 308 can be determined by looking up forwarding table 304 using the source address and multicast address 302 of a multicast packet. In some embodiments, forwarding table 304 is implemented using a content-addressable memory. The second set of bits 310 can be determined based on a multicast tree identifier 306 in the multicast packet. If the multicast packet does not have a multicast tree identifier, the switch can select the second set of bits 310 on its own, e.g., by using a hash-based technique.

Note that the forwarding table does not store an entry for each multicast tree supported by the switch. Instead, the forwarding table stores a single entry for a given source address and multicast address. The second set of bits is then used to select a particular tree from the multiple multicast trees that are associated with the given source address and multicast address. Since the forwarding table is not required to store an entry for each multicast tree, some embodiments of the present invention are capable of supporting a substantially greater number of multicast trees than other approaches that require the forwarding table to store an entry for each multicast tree.

Figure 3B:
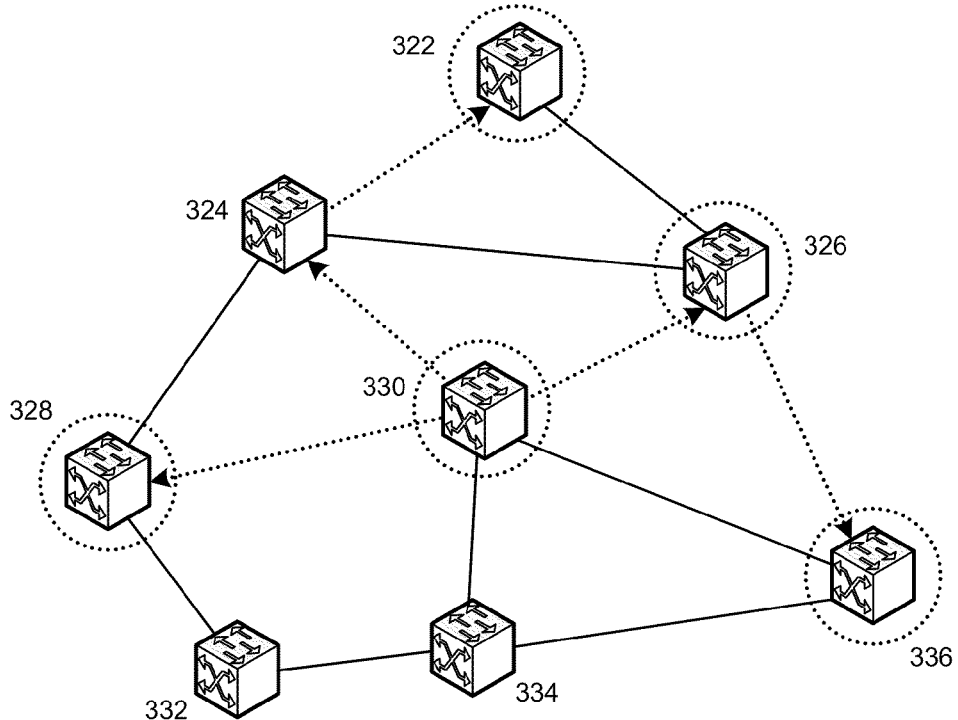
FIGS. 3B and 3C illustrate different multicast trees for the same source and multicast address in accordance with some embodiments of the present invention.
Figure 3C:
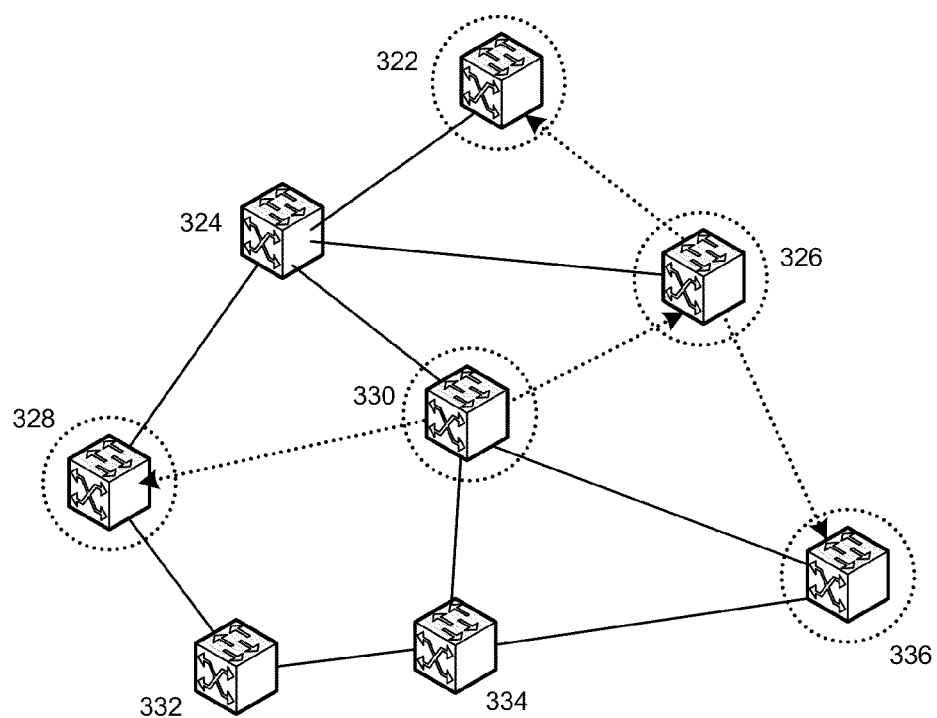

FIGS. 3B and 3C illustrate different multicast trees for the same source and multicast address in accordance with some embodiments of the present invention.

RBridges 322-336 can be in a TRILL network. A multicast group can include RBridges 322, 326, 328, 330, and 336 (the RBridges in the multicast group are shown using a dotted circle). FIGS. 3B and 3C illustrate two multicast trees using dotted lines. Note that both multicast trees are rooted at RBridge 330.

Figure 3D:
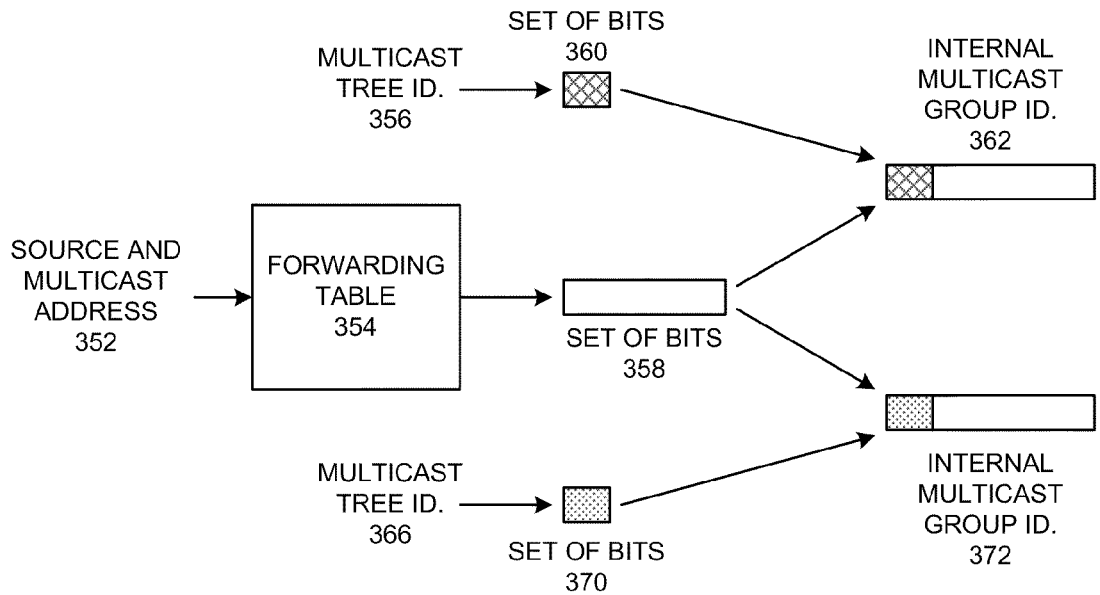
FIG. 3D illustrates how internal multicast group identifiers can be determined in accordance with some embodiments of the present invention.

FIG. 3D illustrates how an internal multicast group identifier can be determined in accordance with some embodiments of the present invention.

When a multicast packet is received at RBridge 326, it may use source and multicast address 352 of the multicast packet to look up forwarding table 354 to obtain a first set of bits 358. Source and multicast address 352 can be Ethernet or IP addresses.

Next, RBridge 326 may use the multicast tree identifier in the multicast packet to determine a second set of bits. Note that the multicast tree identifier in the multicast packet identifies the multicast tree over which the multicast packet is to be forwarded. In some embodiments, the multicast tree identifier is an RBridge nickname. For example, RBridge 330 may be associated with multiple nicknames which may correspond to multiple multicast trees rooted at RBridge 330.

The multicast tree illustrated in FIG. 3B can be associated with multicast tree identifier 356, and RBridge 326 may use multicast tree identifier 356 to determine second set of bits 360. The multicast tree illustrated in FIG. 3C can be associated with multicast tree identifier 366, and RBridge 326 may use multicast tree identifier 366 to determine second set of bits 370.

RBridge 326 can then combine the first set of bits and the second set of bits to obtain the internal multicast group identifier. For example, if the multicast packet contains multicast tree identifier 356, RBridge 326 can combine first set of bits 358 with second set of bits 360 to obtain internal multicast group identifier 362. On the other hand, if the multicast packet contains multicast tree identifier 366, RBridge 326 can combine first set of bits 358 with second set of bits 370 to obtain internal multicast group identifier 372.

Figure 3E:
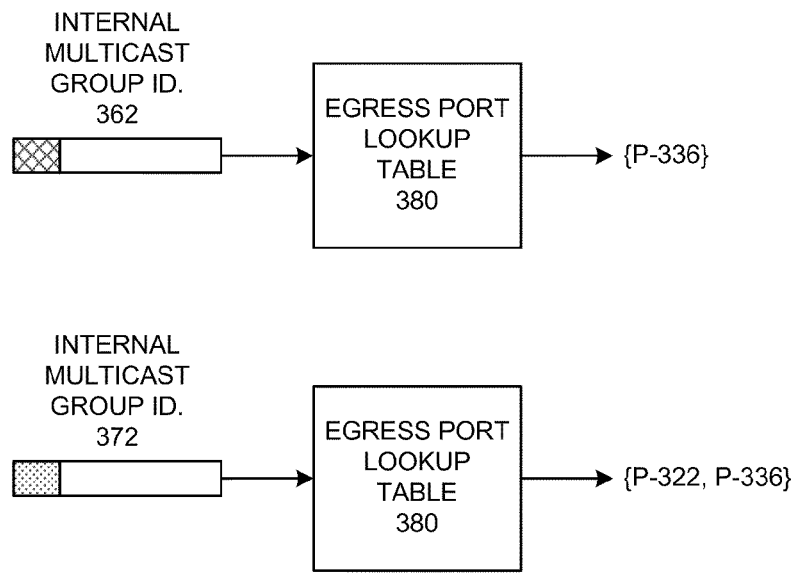
FIG. 3E illustrates how an internal multicast group identifier can be used to determine a set of egress ports in accordance with some embodiments of the present invention.

FIG. 3E illustrates how an internal multicast group identifier can be used to determine a set of egress ports in accordance with some embodiments of the present invention.

Egress port lookup table 380 can be used to determine a set of egress ports based on the internal multicast group identifier. For example, performing a table lookup at RBridge 326 using internal multicast group identifier 362 may output set of egress ports {P-336}. Port P-336 represents a port on RBridge 326 that is coupled to RBridge 336. Similarly, performing a table lookup at RBridge 326 using internal multicast group identifier 372 may output set of egress ports {P-322, P-336}. Port P-322 represents a port on RBridge 326 that is coupled to RBridge 322. Once the set of egress ports has been determined, the system can forward copies of the multicast packet through the egress ports. Egress port lookup table 380 may be implemented as an array that is indexed using the internal multicast group identifier. Each entry in the array may store the set of egress ports.

Network Layer Multicasting in TRILL Networks

Some embodiments provide systems and techniques for performing network layer (e.g., IP layer) multicasting. Computer networking is typically accomplished using a layered software architecture, which is often referred to as a networking stack. Each layer is usually associated with a set of protocols which define the rules and conventions for processing packets in that layer. Each lower layer performs a service for the layer immediately above it to help with processing packets. At the source node, each layer typically adds a header as the payload moves from higher layers to lower layers through the source node's networking stack. The destination node typically performs the reverse process by processing and removing headers of each layer as the payload moves from the lowest layer to the highest layer at the destination node.

The multicast group membership at the network layer (e.g., the IP layer) can span multiple virtual networks, e.g., VPNs and/or VLANs. For example, in FIG. 1, a network layer multicast group may include end-hosts that are part of VLANs 116, 118, and 120 at sites S2, S3, and S4, respectively. In some embodiments, an RBridge can perform network layer multicasting, i.e., the RBridge can forward packets based on a network-layer multicast-address in addition to forwarding packets based on the TRILL header, VPN identifier, MAC addresses, and/or VLAN tags.

Figure 4:
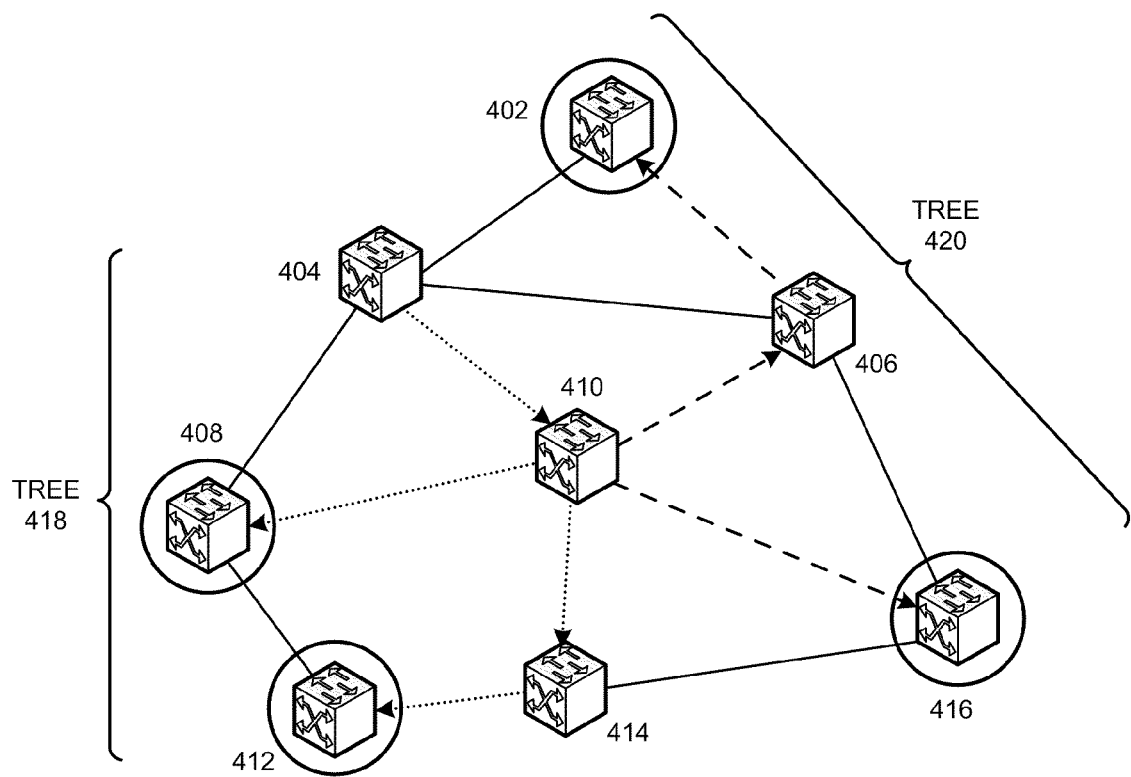
FIG. 4 illustrates how an RBridge can perform network layer multicasting in a TRILL network in accordance with some embodiments of the present invention.

FIG. 4 illustrates how an RBridge can perform network layer multicasting in a TRILL network in accordance with some embodiments of the present invention.

RBridges 402-416 can be in a TRILL network which includes multiple virtual networks, e.g., VPNs and/or VLANs. Each virtual network may support multiple TRILL multicast trees. For example, TRILL multicast tree 418, which is illustrated using dotted lines, may belong to VLAN V1, and TRILL multicast tree 420, which is illustrated using dashed lines, may belong to VLAN V2.

A network layer (e.g., IP layer) multicast group can include end-hosts that are spread across multiple virtual networks, e.g., VPNs and/or VLANs. For example, a multicast group may include end-hosts that are in VPNs and/or VLANs coupled to RBridges 402, 408, 412, and 416 (these RBridges have been highlighted by drawing a circle around them). When a multicast packet for this multicast group is received at an RBridge, the RBridge may forward the multicast packet over a TRILL multicast tree on a particular VLAN. For example, when the multicast packet is received at RBridge 404, it may forward the packet over TRILL multicast tree 418 on VLAN V1.

When the multicast packet is received at RBridge 410, it may forward the packet based on the multicast packet's network-layer multicast-address. Specifically, RBridge 410 may determine that the multicast packet needs to be forwarded on both VLAN V1 and VLAN V2. RBridge 410 may forward the multicast packet on any one of the multiple multicast trees that are supported on VLAN V2. However, to ensure correct multicast forwarding, RBridge 410 may need to forward the multicast packet on VLAN V1 along the same multicast tree on which the multicast packet was received. Specifically, if RBridge 410 forwards the multicast packet on a multicast tree on VLAN V1 that is different from the one it was received on, it can create a forwarding loop and/or the multicast packet may not reach all of the end-hosts in the multicast group. Note that these problems do not arise if the network does not support multiple multicast trees.

Note that an RBridge may or may not be configured to perform network layer multicasting. For example, in the above example, RBridge 404 is not configured to perform network layer multicasting, whereas RBridge 410 is configured to perform network layer multicasting.

In some embodiments, the multicast packet can be a TRILL multicast packet, and can include a multicast tree identifier associated with the multicast tree over which the multicast packet is to be forwarded. The header of a TRILL multicast packet can include a multicast field (e.g., multicast field 250 in FIG. 2) which indicates that the TRILL packet is a multicast packet. The egress RBridge nickname (e.g., egress RBridge nickname 256 in FIG. 2) can correspond to the root of the multicast tree over which the multicast packet is to be forwarded.

Figure 5:
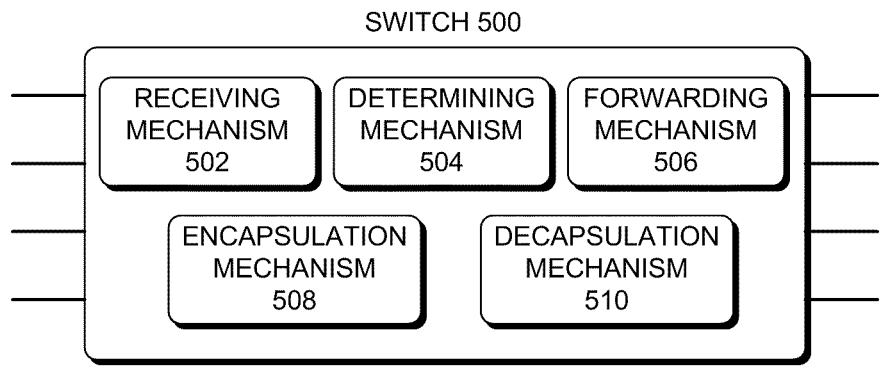
FIG. 5 illustrates a switch in accordance with some embodiments of the present invention.

FIG. 5 illustrates a switch in accordance with some embodiments of the present invention.

Switch 500 can include a plurality of mechanisms which may communicate with one another via a communication channel, e.g., a bus. Switch 500 may be realized using one or more integrated circuits.

In some embodiments, switch 500 is an RBridge (e.g., RBridge 102) which includes receiving mechanism 502, determining mechanism 504, forwarding mechanism 506, encapsulation mechanism 508, and decapsulation mechanism 510. In some embodiments, these mechanisms may be part of an application-specific integrated circuit.

Receiving mechanism 502 may be configured to receive a multicast packet (e.g., an Ethernet or TRILL multicast packet). Determining mechanism 504 may be configured to determine an internal multicast group identifier based on a source address, a multicast address, and a multicast tree identifier field associated with the multicast packet.

Forwarding mechanism 506 may be configured to forward the packet based on the internal multicast group identifier. Specifically, forwarding mechanism 506 may include a table (e.g., an array in memory) which is indexed using the internal multicast group identifier. Each record in the table (e.g., an array element) can include information that indicates how to forward the packet. For example, the record may include a set of egress port identifiers that identifies the egress ports. The record may also include instructions and/or information for modifying one or more fields in the header (e.g., the record may indicate that VLAN translation is to be performed and specify the new VLAN identifier). Additionally, the record may include header fields that need to be added to the packet (e.g., a TRILL header). Multiple copies of a multicast packet may be sent on an egress port of switch 500 if the multicast packet is to be sent to multiple VLANs that are coupled to the egress port.

Encapsulation mechanism 508 may be configured to encapsulate a copy of the multicast packet in a TRILL multicast packet. Specifically, encapsulation mechanism 508 may add a TRILL header to a copy of the multicast packet to obtain a TRILL multicast packet. In some embodiments, the TRILL header and the internal multicast group identifier may be determined concurrently. Once the TRILL header has been added, the TRILL multicast packet can be sent through the outgoing port.

Decapsulation mechanism 510 may be configured to decapsulate a TRILL multicast packet (e.g., by removing the TRILL header) to obtain the multicast packet that was encapsulated in the TRILL multicast packet. The multicast packet can then be forwarded to the customer's network (e.g., a customer VLAN).

In some embodiments, switch 500 (e.g., RBridge 410 in FIG. 4) may be configured to perform network layer multicasting. In these embodiments, receiving mechanism 502 may be configured to receive a multicast packet that includes a network-layer multicast-address. Specifically, receiving mechanism 502 may receive the multicast packet on a first multicast tree (e.g., TRILL multicast tree 418 in FIG. 4) associated with a first virtual network (e.g., VLAN V1). The multicast packet may include a first multicast tree identifier associated with the first multicast tree. The first multicast tree identifier can be the nickname of the RBridge at the root of the first multicast tree.

Determining mechanism 504 may be configured to determine, based on the network-layer multicast-address, one or more multicast trees associated with one or more virtual networks over which the packet is to be forwarded. For example, determining mechanism 504 may be configured to determine, based on the network-layer multicast-address, a second multicast tree (e.g., TRILL multicast tree 420 in FIG. 4) associated with a second virtual network (e.g., VLAN V2) over which the multicast packet is to be forwarded.

Forwarding mechanism 506 may be configured to forward the multicast packet on one or more multicast trees. For example, forwarding mechanism 506 may be configured to forward the multicast packet on the first multicast tree associated with the first virtual network, and forward a copy of the multicast packet on the second multicast tree associated with the second virtual network. The copy of the multicast packet may include a second multicast tree identifier associated with the second multicast tree. The second multicast tree identifier can be the nickname of the RBridge at the root of the second multicast tree.

In some embodiments, determining mechanism 504 may be configured to determine an internal multicast group identifier based on the network-layer multicast-address and a network-layer source-address of the multicast packet, and forwarding mechanism 506 may be configured to forward the multicast packet based on the internal multicast group identifier.

Note that FIG. 5 is for illustration purposes only, and is not intended to limit the present invention to the forms disclosed. Specifically, in some embodiments, switch 500 may not be an RBridge, and/or may include fewer or more mechanisms than those shown in FIG. 5.

Figure 6A:
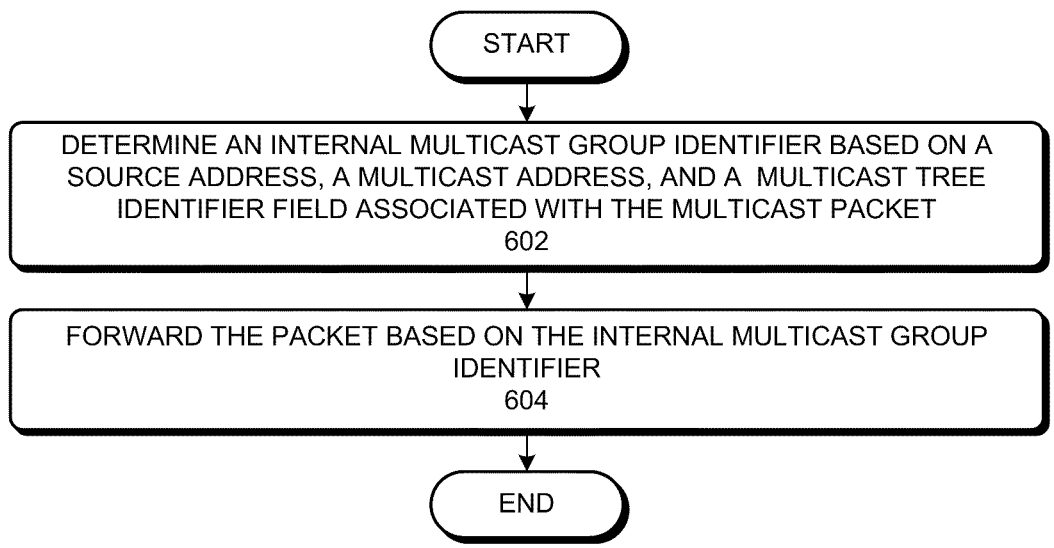
FIG. 6A presents a flowchart that illustrates a process for forwarding packets based on an internal multicast group identifier in accordance with some embodiments of the present invention.

FIG. 6A presents a flowchart that illustrates a process for forwarding packets based on an internal multicast group identifier in accordance with some embodiments of the present invention.

The process can be performed by a switch, e.g., RBridge 102. Upon receiving a multicast packet (e.g., an Ethernet or TRILL multicast packet), the switch can determine an internal multicast group identifier based on a source address (e.g., a source MAC or IP address), a multicast address (e.g., a multicast MAC or IP address), and a multicast tree identifier field associated with the multicast packet (operation 602).

In some embodiments, the system can determine the internal multicast group identifier by combining two sets of bits: one set of bits determined based on the source address and the multicast address, and a second set of bits determined based on the multicast tree identifier. Specifically, in some embodiments, combining the two sets of bits involves concatenating the two sets of bits to create the internal multicast group identifier.

For example, the source IP address and the multicast IP address can be used to look up the first set of bits in a context addressable memory. If the multicast packet includes a multicast tree identifier (e.g., RBridge nickname), then the multicast tree identifier can be used to determine the second set of bits. If the multicast packet does not include a multicast tree identifier, then the system can determine the second set of bits by hashing one or more fields in the multicast packet (or by any other means). Next, the first set of bits can be concatenated with the second set of bits to obtain the internal multicast group identifier.

Next, the switch can forward the multicast packet based on the internal multicast group identifier (operation 604). Specifically, the system can determine a set of egress ports based on the internal multicast group identifier. Next, the system can send at least one copy of the multicast packet through each port in the set of egress ports. The switch can additionally encapsulate the multicast packet in a TRILL multicast packet by adding a TRILL header, and send copies of the TRILL multicast packet through the set of egress ports which was determined based on the internal multicast group identifier.

Figure 6B:
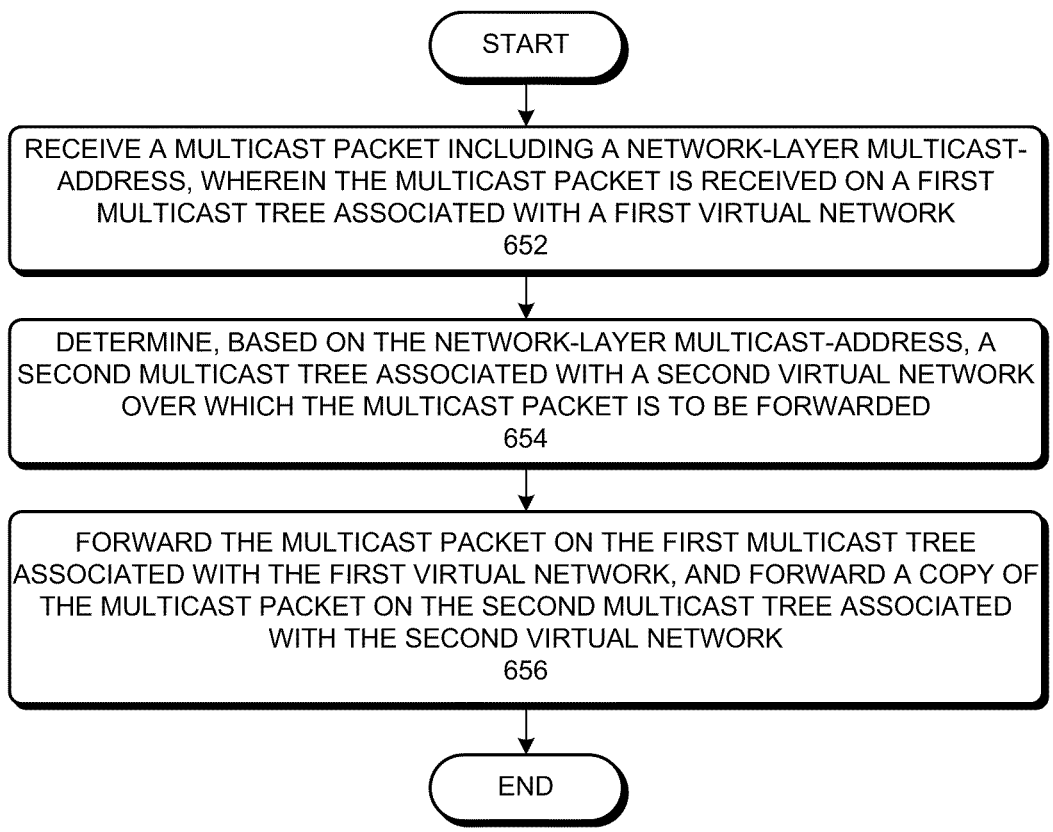
FIG. 6B presents a flowchart that illustrates a process for performing network layer multicasting in a TRILL network in accordance with some embodiments of the present invention.

FIG. 6B presents a flowchart that illustrates a process for performing network layer multicasting in a TRILL network in accordance with some embodiments of the present invention.

The process can be performed by a switch, e.g., RBridge 410 in FIG. 4. The switch can receive a multicast packet (e.g., an Ethernet or TRILL multicast packet) that includes a network-layer multicast-address, wherein the multicast packet is received on a first multicast tree associated with a first virtual network (operation 652). For example, RBridge 410 may receive a multicast packet from RBridge 404 over TRILL multicast tree 418 on VLAN V1.

Next, the switch can determine, based on the network-layer multicast-address, a second multicast tree associated with a second virtual network over which the multicast packet is to be forwarded (operation 654). For example, RBridge 410 may determine TRILL multicast tree 420 on VLAN V2 over which the multicast packet is to be forwarded. The second multicast tree can be determined randomly or it can be determined based on link utilization (e.g., by determining the least congested multicast tree).

The switch can then forward the multicast packet on the first multicast tree associated with the first virtual network, and forward a copy of the multicast packet on the second multicast tree associated with the second virtual network (operation 656). For example, RBridge 410 may forward the multicast packet to RBridges 408 and 414 over TRILL multicast tree 418, and forward a copy of the multicast packet to RBridges 406 and 416 over TRILL multicast tree 420.

Figure 7:
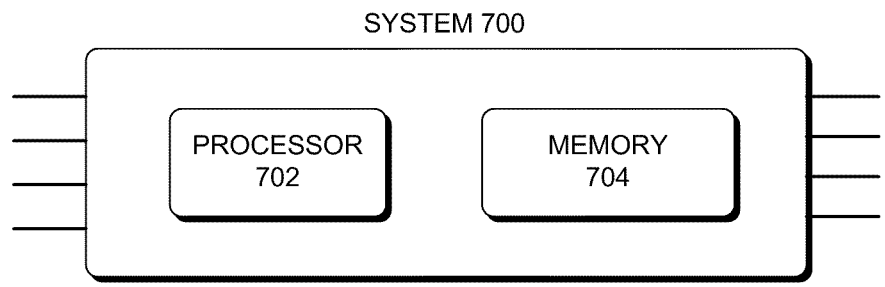
FIG. 7 illustrates a system in accordance with some embodiments of the present invention.

FIG. 7 illustrates a system in accordance with some embodiments of the present invention.

System 700 can include processor 702 (e.g., a network processor) and memory 704. Processor 702 may be capable of accessing and executing instructions stored in memory 704. For example, processor 702 and memory 704 may be coupled by a bus. Memory 704 may store instructions that when executed by processor 702 cause system 700 to perform the processes illustrated in FIGS. 6A and/or 6B.

Specifically, memory 704 may store instructions for receiving a multicast packet, determining an internal multicast group identifier for a multicast packet based on a source address, a multicast address, and a multicast tree identifier field associated with the multicast packet, and forwarding the multicast packet based on the internal multicast group identifier. Memory 704 may optionally store instructions for encapsulation and/or decapsulation.

In some embodiments, the multicast packet include a network-layer multicast-address and it may be received on a first multicast tree associated with a first virtual network. Memory 704 may store instructions for determining, based on the network-layer multicast-address, a second multicast tree associated with a second virtual network over which the multicast packet is to be forwarded. In these embodiments, memory 704 may also store instructions for forwarding the multicast packet on the first multicast tree associated with the first virtual network, and forwarding a copy of the multicast packet on the second multicast tree associated with the second virtual network.

The data structures and code described in this disclosure can be partially or fully stored on a non-transitory computer-readable storage medium and/or a hardware module and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes.

The methods and processes described in this disclosure can be partially or fully embodied as code and/or data stored in a computer-readable storage medium or device, so that when a computer system reads and/or executes the code and/or data, the computer system performs the associated methods and processes. The methods and processes can also be partially or fully embodied in hardware modules or apparatuses, so that when the hardware modules or apparatuses are activated, they perform the associated methods and processes. Further, the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A switch, comprising:
   determining circuitry configured to:
      determine an internal multicast group identifier comprising a first and a second sets of bits, wherein the first set of bits is based on a source address and a multicast address associated with a multicast packet, wherein the second set of bits is based on:
         a multicast tree identifier in response to associated with the multicast packet being associated with the multicast tree identifier; and
         a hash-based technique in response to the multicast packet not being associated with a multicast tree identifier; and
      wherein scope of the internal multicast group identifier is internal and local within the switch; and
   forwarding circuitry configured to determine one or more output ports for the multicast packet by performing a lookup using the internal multicast group identifier.

2. The switch of claim 1, wherein the determining circuitry is configured to:
   combine the first set of bits and the second set of bits to determine the internal multicast group identifier by concatenating the first set of bits and the second set of bits.

3. The switch of claim 1, wherein the forwarding circuitry is further configured to:
   associate at least one copy of the multicast packet with a respective port in the one or more output ports.

4. The switch of claim 1, wherein the multicast packet is a multicast TRILL (Transparent Interconnection of Lots of Links) packet.

5. The switch of claim 1, wherein the multicast tree identifier field is a routing bridge (RBridge) nickname.

6. The switch of claim 1, wherein the source address and the multicast address are Ethernet medium access control (MAC) addresses.

7. The switch of claim 1, wherein the source address and the multicast address are Internet Protocol (IP) addresses.

8. A computing system, comprising:
   a processor; and a memory storing instructions that when executed by the processor cause the system to perform a method, the method comprising:
  determining an internal multicast group identifier comprising a first and a second sets of bits, wherein the first set of bits is based on a source address and a multicast address associated with a multicast packet, wherein the second set of bits is based on:
    a multicast tree identifier in response to associated with the multicast packet, being associated with the multicast tree identifier; and
    a hash-based technique in response to the multicast packet not being associated with a multicast tree identifier; and
  wherein scope of the internal multicast group identifier is internal and local within the system; and
  determining one or more output ports for the multicast packet by performing a lookup using the internal multicast group identifier.

9. The computing system of claim 8, wherein the method further comprising:
  combining the first set of bits and the second set of bits by concatenating the first set of bits and the second set of bits.

10. The computing system of claim 8, wherein the method comprises:
  associating at least one copy of the multicast packet with a respective port in the one or more output ports.

11. The computing system of claim 8, wherein the multicast packet is a multicast TRILL (Transparent Interconnection of Lots of Links) packet.

12. The computing system of claim 8, wherein the multicast tree identifier field is a routing bridge (RBridge) nickname.

13. The computing system of claim 8, wherein the source address and the multicast address are Ethernet medium access control (MAC) addresses.

14. The computing system of claim 8, wherein the source address and the multicast address are Internet Protocol (IP) addresses.

15. A method, comprising:
  determining an internal multicast group identifier comprising a first and a second sets of bits, wherein the first set of bits is based on a source address and a multicast address associated with a multicast packet, wherein the second set of bits is based on:
    a multicast tree identifier in response to associated with the multicast packet, being associated with the multicast tree identifier; and
    a hash-based technique in response to the multicast packet not being associated with a multicast tree identifier; and
  wherein scope of the internal multicast group identifier is internal and local within a switch; and
  determining one or more output ports for the multicast packet by performing a lookup using the internal multicast group identifier.

16. The method of claim 15, further comprising:
  combining the first set of bits and the second set of bits by concatenating the first set of bits and the second set of bits.

17. The method of claim 15, further comprising:
  associating at least one copy of the multicast packet with a respective port in the one or more output ports.

18. The method of claim 15, wherein the multicast packet is a multicast TRILL (Transparent Interconnection of Lots of Links) packet.

19. The method of claim 15, wherein the multicast tree identifier field is a routing bridge (RBridge) nickname.

20. The method of claim 15, wherein the source address and the multicast address are Ethernet medium access control (MAC) addresses.

21. The method of claim 15, wherein the source address and the multicast address are Internet Protocol (IP) addresses.

* * * * *